United States Patent [19]

Welschof et al.

[11] Patent Number: 4,698,047
[45] Date of Patent: Oct. 6, 1987

[54] ROTARY CONSTANT VELOCITY UNIVERSAL JOINT HAVING TRACKS OF UNIFORM CURVATURE

[75] Inventors: Hans-Heinrich Welschof, Rodenbach; Joachim Schöneberger, Offenbach am Main, both of Fed. Rep. of Germany

[73] Assignee: Löhr & Bromkamp GmbH, Offenbach am Main, Fed. Rep. of Germany

[21] Appl. No.: 890,809

[22] Filed: Jul. 24, 1986

Related U.S. Application Data

[63] Continuation of Ser. No. 789,924, Oct. 21, 1985, abandoned, which is a continuation of Ser. No. 556,584, Nov. 30, 1983, abandoned.

[30] Foreign Application Priority Data

Nov. 30, 1982 [DE] Fed. Rep. of Germany ....... 3244196

[51] Int. Cl.⁴ ................................ F16D 3/23
[52] U.S. Cl. .................................... 464/145; 464/906
[58] Field of Search ............... 464/143, 144, 145, 906

[56] References Cited

U.S. PATENT DOCUMENTS

| 3,475,924 | 11/1969 | Aucktor | 464/145 X |
| 3,879,960 | 4/1975 | Welschof et al. | 464/145 |
| 4,078,400 | 3/1978 | Krude | 464/145 |
| 4,116,020 | 9/1978 | Aucktor et al. | 464/145 |
| 4,188,803 | 2/1980 | Otsuka et al. | 464/145 |

FOREIGN PATENT DOCUMENTS

| 2311960 | 12/1976 | France | 464/145 |
| 61822 | 4/1982 | Japan | 464/145 |
| 2096738 | 10/1982 | United Kingdom | 464/145 |

Primary Examiner—Daniel P. Stodola
Attorney, Agent, or Firm—Toren, McGeady & Associates

[57] ABSTRACT

In a universal joint having inner and outer joint members with grooves formed therein and torque-transmitting balls interposed within the grooves, the grooves of at least one of the joint members is formed to extend in a curved configuration wherein lines extending tangentially to the curved configuration will intersect the central axis of the joint at angles which increase, taken from one point on the curved configuration to another.

8 Claims, 3 Drawing Figures

ROTARY CONSTANT VELOCITY UNIVERSAL JOINT HAVING TRACKS OF UNIFORM CURVATURE

This is a continuation of application Ser. No. 789,924, filed Oct. 21, 1985 now abandoned which is a continuation of application Ser. No. 556,584, filed Nov. 30, 1983, now abandoned.

The present invention relates generally to a rotary constant velocity universal joint and more particularly to the manner of configuring the joint in order to increase the angle of articulation thereof.

In rotary constant velocity universal joints of the type to which the present invention relates, there is normally provided a hollow outer joint member having an inner face wherein provision is made for running tracks or grooves which extend in circumferentially spaced planes containing the plane of rotation of the respective joint member. Such universal joint is also formed with an inner joint member having an outer face wherein provision is also made for running tracks or grooves which correspond to the running tracks in the outer joint member. A hollow cage arranged between the inner and outer joint members is formed with a spherical outer face which is guided relative to the outer joint member preferably in a spherical inner face between two adjoining running tracks of the outer joint member, by a spherical inner face on a spherical outer face between two adjoining running tracks of the inner joint member. The cage in the region of the running tracks is provided with openings in the form of windows which preferably accommodate the torque-transmitting rolling members which may be spherical balls, each of which is guided in the corresponding running tracks of the inner and outer joint members, with the running tracks in the inner and outer joint members extending in a curved configuration.

It has been proposed to provide joints with running tracks which are composed of track parts of different extensions in order to achieve grooves or tracks which are free from undercuts. At the same time, it has also been proposed to achieve this goal by means of a circular track having a center which is in the plane of the greatest opening cross-section of the joint part. In this connection, reference is made to U.S. Pat. No. 3,879,960.

However, although circular tracks make it possible to achieve grooves which are free from undercuts and have greater articulation angles, they have considerable disadvantages with regard to control of the torque-transmitting elements in the angle bisecting plane. Additionally, there are frequently required measures to prevent the torque-transmitting balls from leaving the respective guide faces of the cage at larger angles of articulation.

Although composite tracks may be designed in such a manner that they will result in better functional control, they nevertheless have disadvantages with regard to the remaining functions of the joint. For example, areas where the course of the track changes may lead to noise which will be further intensified by difficulties encountered in producing such shapes. Also, inaccuracies which are developed may lead to a different distribution of the load on the torque-transmitting elements and thus possibly lead to local overloading and early failure of the joint.

The present invention is therefore directed toward provision of a rotary constant velocity universal joint having a track of the type which will permit an increase in the maximum angle of articulation of the joint without adversely affecting the control functions of the joint or the running behavior and the guidance of the torque-transmitting elements in the radial direction.

SUMMARY OF THE INVENTION

Briefly, the present invention may be described as a rotary constant velocity universal joint having a center axis including an outer joint member having an inner face with a plurality of grooves or running tracks therein, an inner joint member having an outer face with grooves or running tracks formed therein which correspond to the running tracks in the outer joint member, and a cage arranged between the inner and the outer joint members there are supported a plurality of torque-transmitting members, preferably spherical balls, interposed between the inner and outer joint members and operatively engaged within the running tracks thereof. In accordance with the invention, the grooves or running tracks in at least one of the inner and outer joint members are formed to extend in a curved configuration from a first point thereon to a second point thereon which is radially closer to the central axis than said first point, with the curved configuration being formed such that axially directed lines extending tangentially to said curved configuration will intersect the central axis at angles which increase taken from the first point to the second point.

Thus, the objectives of the invention are achieved in that the running tracks or grooves, and especially the track base or contact track of the rolling members in the running tracks, represent a copy of the track curve of the centers of the rolling members across the articulation range of the joint which, starting from the point in which the track base of a running track is at the greatest distance from the axis of rotation of the respective joint member, extends in such a manner that the angle of intersection formed by the tangent at the track curve and the axis of rotation of the respective joint member increases constantly.

The advantages of a design in accordance with the present operation are that even the machining operations forming the tracks do not have an adverse effect on the quality of the joint, especially its torque-transmitting ability, its running behavior, and noise characteristics. On the other hand, the track course also permits production of precise formations. It is an additional advantage of the invention that the joint is capable of achieving greater angles of articulation while improving the control of the torque-transmitting elements.

In accordance with a more specific aspect of the invention, the track curves are preferably formed with a logarithmic function, hyperbola, parabola, involute or cycloid.

In order to achieve a good control function in the range of the smaller angles of articulation, in accordance with a further more specific feature of the invention, provision is made for the angle of intersection in the range of articulation to be approximately 0° to 10°, and more specifically 7° to 10°.

In accordance with a further specific feature of the invention, good control of the torque-transmitting elements at large angles of articulation will be achieved if, in the last third of the articulation range, the angle of intersection is greater than half the respective angle.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
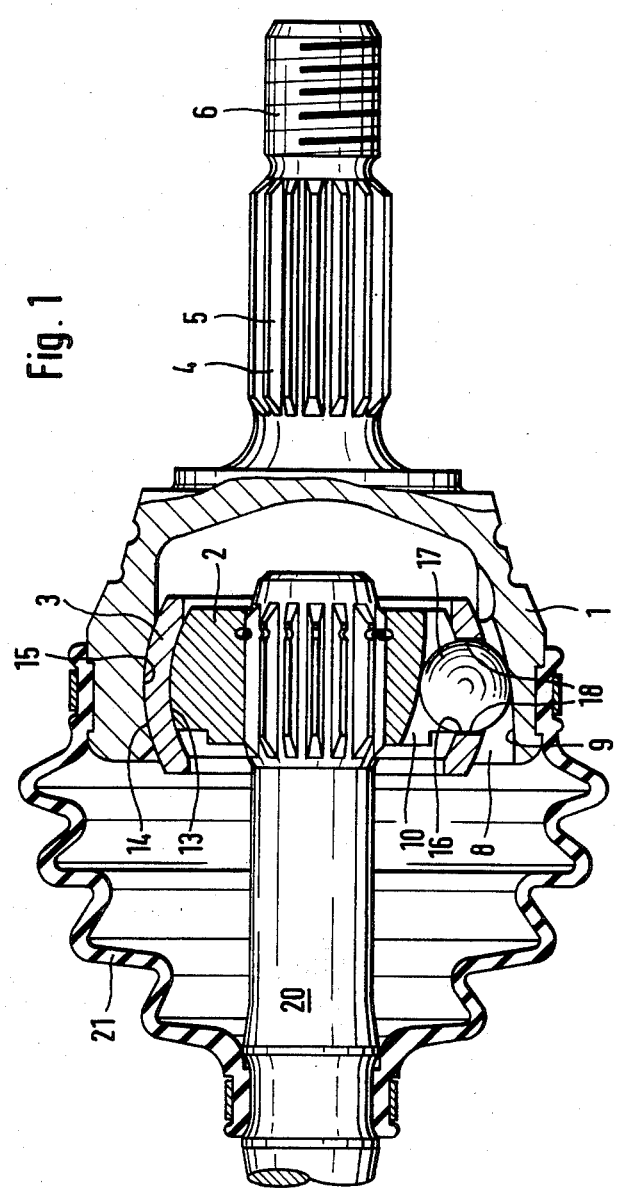
FIG. 1 is a longitudinal sectional view showing a rotary constant velocity universal joint in accordance with the present invention.

Referring now to the drawings, wherein similar reference numerals are used to refer to like parts in the various figures thereof, there is shown a universal joint in accordance with the present invention which is composed of an outer joint member 1, an inner joint member 2 having a cage 3 arranged therebetween for support in operative engagement therein of torque-transmitting members 17 which are in the form of spherical balls.

Figure 2:
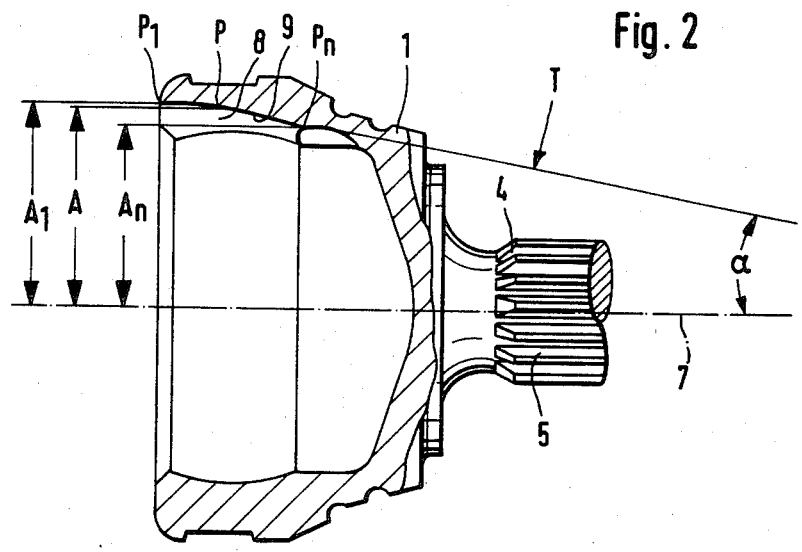
FIG. 2 is a partial sectional view of an outer joint member in accordance with the invention.
Figure 3:
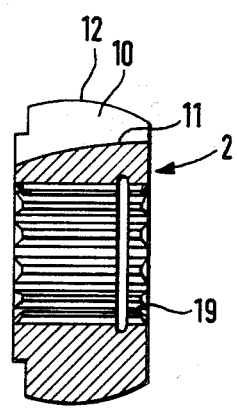
FIG. 3 is a sectional view of the inner joint member of the joint in accordance with the the invention.

The outer joint member 1, as illustrated in FIG. 2, is provided with a connecting pin 4 which may be inserted, for example, into the wheel bearing of a driven wheel of a motor vehicle (not shown) and which is formed with teeth 5 whereby the pin 4 may be rotationally connected to the wheel hub and may be secured thereto by a nut which may be threadedly attached onto a threaded pin 6 shown in FIG. 1 at the end of the pins 4.

The outer joint member 1 is formed to comprise running tracks or grooves 8 which are formed into the inner wall of the member 1 and which are distributed about the axis of rotation 7 thereof. In the present invention, provision is made for six running tracks 8, one of which is illustrated in greater detail in the longitudinal section of FIGS. 1 and 2 arranged in such a way that the upper half depicts a section through a running track 8 and the lower half a section between two adjoining running tracks 8. Similar considerations apply to the inner joint member 2.

The inner joint member 2 is formed with an outer face 12 wherein there are provided running tracks or grooves 10 which are arranged to correspond with the running tracks or grooves 8 formed in the outer joint member 1.

The outer face 12 of the inner joint member 2 forms part of a spherical face, especially the stays remaining between two adjoining tracks 10. The cage 3 is formed with a spherical inner face 13 which is guided on the spherical outer face 12 of the inner joint member 2. The cage 3 is formed with a spherical outer face 14 whereby the cage 3 is received in a spherical inner face 15 of the outer joint member 1. Furthermore, the cage 3 is formed with openings 16 which are provided in a number which corresponds to the number of running tracks 8 and 10 of the joint members 1 and 2, with the positions of the openings 16 corresponding to the positions of the running tracks 8 and 10. The openings 16 receive therein the torque-transmitting balls 17 which, taken in the direction of articulation, are supported at limiting faces 18 of the openings 16. The balls 17 are, in turn, guided in two corresponding running tracks 8, 10 of the inner and outer joint members 1,2 respectively.

The inner joint member is capable of effecting angular movement relative to the outer joint member with the balls 17 moving along the running tracks 8 and 10 and with the cage 3 being set at half the angle of articulation while holding the balls 17 in this plane. If the joint is fully extended, i.e., if the angle of articulation equals 0, then this plane will extend vertically relative to the axis of rotation 7 of the outer joint member 1 and that of the inner joint member 2. The inner joint member 2 has a central bore 19 with axially extending teeth into which a shaft 20 is inserted, the shaft 20 being provided with appropriate teeth. The joint is sealed by an appropriate boot 21 which at one end is affixed to the shaft 20 and which at the other end is attached to the outer circumference of the outer joint member 1 so as to maintain the interior of the joint sealed. The joint interior is filled with a lubricant.

With regard to the course of the tracks, it is immaterial whether the joint is formed with a cage 3 of the type described above or whether provision is made only for supporting discs arranged laterally relative to the inner joint member.

Of course, as is well known, universal joints serve as machine elements for transmitting torque especially with a changing angular position of the two axes relative to each other, and such joints are preferably used for driving the wheels of a motor vehicle.

The running tracks 8 in the outer joint member 1, and especially the track base, are formed with a course which is undercut-free. This means that a distance A of the track base 9 starting from the greatest distance $A_1$ to the smallest distance $A_n$ will decrease. The track base is designed as a continuous curve. The formation of the curve is such that tangential lines T extending tangentially to the curved configuration at a point P will intersect with an angle $\alpha$ the rotation axis 7. The angle of intersection $\alpha$ between tangent lines T and the rotation axis 7 increases commencing from a taken tangent to first point $P_1$ on the curved configuration to line taken tangent to a second point $P_n$ on the curved configuration. Thus, commencing from a smallest angle $\alpha_1$, which is the angle of intersection between the rotational axis 7 and the line extending tangentially to the first point $P_1$, the angle $\alpha$ increases continuously until largest angle $\alpha_n$, which is the angle of intersection between the axis 7 and the line extending tangentially to a second point $P_n$.

The curves represented by the foregoing description may be formed as hyperbolae, parabolae, involutes or cycloids and additionally they may for example follow a logarithmic function.

The smallest angle $\alpha_1$ of intersection is preferably at least 7° and may if necessary extend to 10°. In the last third of the range of the angles of articulation of the joint, the intersection angle $\alpha$ should be greater than half the respective articulation angle.

The running tracks 10 of the inner joint member 2 are designed to correspond to those of the outer joint member 1, i.e., the track base 11 extends in accordance with that of the running tracks 8 of the outer joint member 1.

It is also possible to provide the aforementioned features to the contact track only, i.e., the track of contact between the torque-transmitting balls 17 and the running tracks 8 and 10 with a corresponding cross-section.

Accordingly, it will be seen from the foregoing that the present invention provides a rotary constant velocity universal joint wherein the shape of the track for the running tracks of such joints is configured so as to increase the maximum achievable angle of articulation without creating any adverse effect on the control function, the running behavior or the guidance of the balls.

The objectives of the invention are achieved by forming the track from continous curves with continuously increasing angles of intersection between the track tangent and the axis of rotation.

The invention is particularly characterized in that the running tracks 8, and especially their track base 9 or the contact track of the rolling members 17 in the running track 8 represent a copy of the track curve of the centers of the rolling members 17 across the articulation range of the joint which, starting from the point $P_1$ in which the track base 9 of the running track 8 is at the greatest distance $A_1$ from the axis of rotation 7 of the respective joint member 1, extends in such a way that the angle of intersection $\alpha$ formed by the tangent T at the track curve and the axis of rotation 7 of the respective joint member 1 increases constantly.

The invention is further characterized in that within the articulation angle range of 0° to approximately 10° the angle of intersection $\alpha$ will be between 7° and 10°.

While specific embodiments of the invention have been shown and described in detail to illustrate the application of the inventive principles, it will be understood that the invention may be embodied otherwise without departing from such principles.

What is claimed is:

1. In a rotary constant velocity universal joint including an outer hollow joint member having an inner face wherein provision is made for running tracks extending in circumferentially spaced planes containing the plane of rotation of the joint member, an inner joint member having an outer face wherein provision is made for running tracks corresponding to the running tracks in said outer joint members, a hollow cage arranged between said outer and inner joint members having a spherical outer face which, relative to said outer joint member, is guided in a spherical inner face between two adjoining running tracks of the outer joint member and by a spherical inner face on a spherical outer face between two adjoining running tracks of the inner joint member, and wherein said cage in the region of the running tracks has been provided with openings in the form of windows which accommodate rolling members each of which is guided in the corresponding running tracks of said inner and outer joint members, and wherein said running tracks in the inner and outer joint members extend in a curved configuration, the improvement comprising:

that said running tracks are formed with a curvature which represents a copy of the track curve of the centers of said rolling members across the articulation range of said joint, which curvature, starting from a first point at which said curvature of said running tracks is at a greatest distance from the axis of rotation of the respective joint member, extends in such a way that the angle of intersection formed by a tangent at said curvature and the axis of rotation of the respective joint member increases constantly;

that said curvature of said running tracks is a continuous curve extending over the entire extent of said running tracks and defined by differing radii gradually decreasing from a maximum radius at said first point to a minimum radius in accordance with a uniform mathematical function; and that within an articulation range of 0° to approximately 10°, the angle of intersection is 7° to 10°.

2. A joint according to claim 1 wherein said curvature represents a track base of said running tracks.

3. A joint according to claim 1 wherein said curvature represents a contact track of the rolling members in said running track.

4. A joint according to claim 1 wherein said curvature follows a logarithmic function.

5. A joint according to claim 2 wherein said curvature follows a hyperbolic function.

6. A joint according to claim 1 wherein said curvature follows a parabolic function.

7. A joint according to claim 1 wherein said curvature is an involute.

8. A joint according to claim 1 wherein said curvature is a cycloid.

* * * * *